W. B. Dunning,
Making Staves.
Nº 19,760. Patented Mar. 30, 1858.
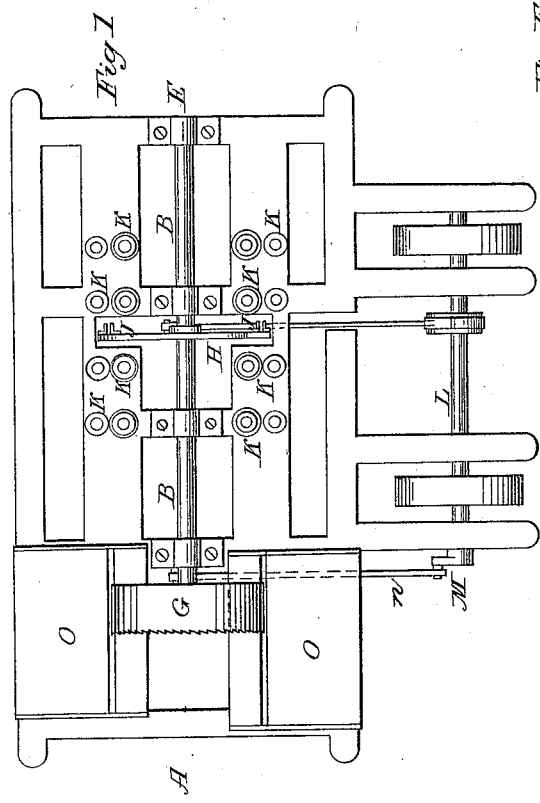
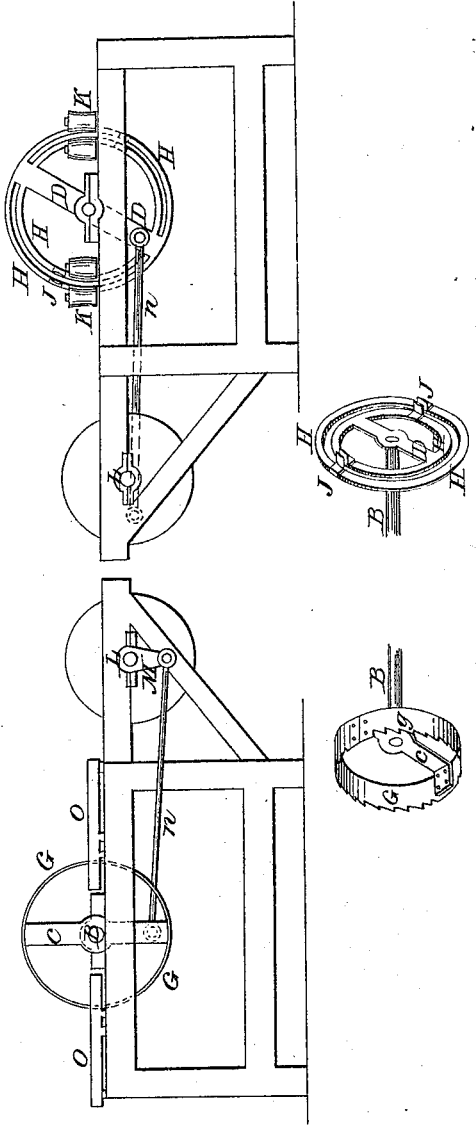

UNITED STATES PATENT OFFICE.

WM. B. DUNNING, OF GENEVA, NEW YORK.

ROTARY RECIPROCATING KNIFE FOR SMOOTHING STAVES.

Specification of Letters Patent No. 19,760, dated March 30, 1858.

*To all whom it may concern:*

Be it known that I, WILLIAM B. DUNNING, of Geneva, in the county of Ontario and State of New York, have invented certain new and useful Improvements in Machinery for Manufacturing Staves; and I do hereby declare and ascertain the same as follows, reference being had to the accompanying drawings, illustrative thereof.
In constructing my new stave machine I build a substitute frame of wood or any other suitable material, the general form of which is shown in Figure 1, "A" being the front and "E" the rear end thereof. The size and proportions of this frame depend somewhat upon the size and length of staves which the machine is calculated to make. In this frame I suspend the rock shaft "B," on which I attach the arms "C" "C," and at a proper distance therefrom I attach the arms "D" "D." The arms "C," "C," have short arms projecting from their outer ends, standing out toward the front end of the machine and at right angles with the main arms "C" "C." To these arms I attach the cutting saws "G" "G," each saw having been previously bent into the form of a half circle, the diameter of which circle should correspond with the diameter of the article for which the staves are designed. On the arms "D," "D" I attach the circular rims "H" "H" "H" "H" and to these rims are attached the smoothing cutters "I," "I," "I," "I." These cutters are located at such a distance from the main rock shaft "B" as to correspond in that respect with the position of the cutting saws "G," "G" and allow the staves to pass directly from the saws through the said smoothing cutters, the stave being carried along by the feed rollers "K," "K," "K," "K" which may be actuated by any convenient mechanism for that purpose. An oscillating movement is given to the cutting saws and smoothing cutters by means of a shaft passing along on one side of the main frame as seen at "L" on which a crank "M" (or eccentric) is located and from which a pitman "N" extends to and connects with one of the arms on the main rock shaft, or to a separate arm attached thereto for that purpose. This crank shaft may be revolved by a band or otherwise, and the pitman being connected with the rock shaft at a greater distance from its center than the length of the crank "M," would cause the cutting tools to oscillate in the arc of a circle and the range of this oscillating movement can be varied by varying the point of attachment of the pitman on the arm as described and a different speed in the movement of the cutting saws and smoothing cutters may be attained by placing them on two separate shafts, (or having one of them loose on the same shaft) and using two pitmen to drive them.

A feed table is arranged opposite to each saw as seen at "O" "O" to carry the plank from which the staves are to be cut, and the staves when cut entirely off by the cutting saws, are carried along through the smoothing cutters by the feed rollers as above described.

By this arrangement and construction of a stave machine very narrow saws may be used and consequently the stuff may be easily and accurately guided, as there is little or no tendency to deviate from a straight line in its unobstructed passage through the machine, and great durability of the saws is insured by their attachment at each end and so nearly on a line with the point of cutting.

The quality of the work done by this machine is superior because the cutting saws are so secured as to work almost entirely free from the vibration and crowding of the long revolving cylinder saws heretofore used for this purpose and the staves are much smoother, being finished by additional cutters having the movement and in the same (or nearly the same) curve given them by the cutting saws—so that without rehandling—the stuff may be converted into smooth and perfect staves by one process.

The machine as above described and shown in the drawings, represents a double set of cutting saws and smoothing cutters worked from the same shaft, so that two staves may be made at the same time—but if desired the machine may be made with only one saw and a corresponding pair of smoothing cutters so as to make but one stave at once. It is however, more economical, for ordinary purposes, to run the machine with double sets of smoothing cutters and corresponding saws as one attendant can thereby cut two staves at once.

In large machines for staves of great length, the cutting saws may be attached to one shaft, and the smoothing cutters entirely independent on another shaft on the same frame, or if desired they could be located on separate frames, but the necessity for such arrangement may be seldom realized—because the cutting saws may be so cheaply made that several sets of different diameters may be fitted to the same machine and by constructing the feed tables so as to admit of a lateral adjustment and providing additional sets of rims for the smoothing cutters whose diameters correspond to the different sets of cutting saws—the machine would admit of a complete and easy adjustment for the manufacture of differently proportioned staves.

I do not claim the vibrating saws as they have before been used, but

What I claim herein as my invention and for which I desire to secure Letters Patent is—

The construction, arrangement and employment of the oscillating cuttings tools for smoothing the staves, &c., substantially in the manner herein set forth.

In testimony whereof I have hereunto set my hand.

WM. B. DUNNING.

Witnesses:
GEO. R. DUSINBERRE,
MORRIS W. HERNNIP.